US012134924B2

(12) United States Patent
Ellefred et al.

(10) Patent No.: US 12,134,924 B2
(45) Date of Patent: Nov. 5, 2024

(54) DOOR HINGE

(71) Applicants: Joerg Ellefred, Rheda-Wiedenbrueck (DE); Nicolas Liermann, Rheda-Wiedenbrueck (DE)

(72) Inventors: Joerg Ellefred, Rheda-Wiedenbrueck (DE); Nicolas Liermann, Rheda-Wiedenbrueck (DE)

(73) Assignee: SIMONSWERK GMBH

( * ) Notice: Subject to any disclaimer, the term of this patent is extended or adjusted under 35 U.S.C. 154(b) by 62 days.

(21) Appl. No.: 17/975,025

(22) Filed: Oct. 27, 2022

(65) Prior Publication Data

US 2023/0151657 A1 May 18, 2023

(30) Foreign Application Priority Data

Nov. 16, 2021 (DE) ......................... 102021129879.2

(51) Int. Cl.

*E05D 3/06* (2006.01)
*E05D 3/18* (2006.01)
*E05D 7/04* (2006.01)

(52) U.S. Cl.

CPC ...... *E05D 3/186* (2013.01); *E05D 2007/0469* (2013.01); *E05D 2007/0484* (2013.01)

(58) Field of Classification Search

CPC .... E05D 3/06; E05D 3/12; E05D 3/14; E05D 3/142; E05D 3/16; E05D 3/125; E05D 3/127; E05D 3/185; E05D 3/186; E05D 7/04; E05D 7/0423; E05D 7/0415; E05D 7/043; E05D 7/0027; E05D 7/0045; E05D 5/02; E05D 5/0215; E05D 5/062; E05D 2007/0438; E05D 2007/0446; E05D 2007/0453; E05D 2007/0461; E05D 2007/0469; E05D 2007/0476; E05D 2007/0484; E05D 2007/0492; E05D 9/00; E05Y 2600/41; E05Y 2600/634; E05Y 2600/412; E05Y 2600/45; E05Y 2600/452; E05Y 2600/46; E05Y 2600/51; E05Y 2900/132; E05Y 2900/20; E05Y 2900/50; E05Y 2900/531; E05Y 2900/546; E05Y 2201/624; E05Y 2201/638; E05Y 2800/45; E05Y 2800/674

See application file for complete search history.

(56) References Cited

U.S. PATENT DOCUMENTS 5,044,044 A * 9/1991 Young ....................... E05D 3/18 16/349
7,861,378 B2 1/2011 Neukoetter
(Continued)

FOREIGN PATENT DOCUMENTS

CN 2900729 Y * 5/2007
CN 212428405 U * 1/2021
(Continued)

*Primary Examiner* — Chuck Y Mah
(74) *Attorney, Agent, or Firm* — Andrew Wilford

(57) ABSTRACT

A door hinge has first and second leaf assemblies. The first assembly is formed with a longitudinal guide groove. First and second links are connected to each other for relative pivoting about a vertical axis. The first link is pivoted in a longitudinally displaceable slide in the groove. This slide has a length longitudinally of the guide groove and a width transversely of the guide groove. The ratio of the length to the width of the slide is at least 2:1.

17 Claims, 4 Drawing Sheets

(56) References Cited

U.S. PATENT DOCUMENTS

| | | | | |
|---|---|---|---|---|
| 8,863,361 | B2 | 10/2014 | Neukoetter | |
| 2012/0180396 | A1* | 7/2012 | Liermann | E05D 3/186<br>16/369 |
| 2020/0208458 | A1* | 7/2020 | Elsmark | E05D 3/18 |

FOREIGN PATENT DOCUMENTS

| | | | | | |
|---|---|---|---|---|---|
| CN | 213391675 | U | * | 6/2021 | |
| CN | 214576395 | U | * | 11/2021 | |
| EP | 1754848 | A | | 2/2007 | |
| EP | 2781676 | A1 | * | 9/2014 | E05D 11/1014 |
| ES | 1138432 | U | * | 4/2015 | E05D 3/186 |

* cited by examiner

DOOR HINGE

FIELD OF THE INVENTION

The present invention relates to a door hinge. More particularly this invention concerns a door hinge that is concealed in a closed position of the door.

BACKGROUND OF THE INVENTION

A typical concealed door hinge has first and second leaf assemblies and first and second links that are connected to each other for relative pivoting about a vertical axis with the first hinge link in the first leaf assembly and the second hinge link in the second leaf assembly. The first link is pivoted in a longitudinally shiftable slide held in a longitudinal guide groove of the first leaf assembly.

A generic state of the art is known for example from EP 1 754 848 describing a door hinge for a concealed arrangement between door frame and door panel. The links are each mounted in a leaf assembly at one end so as to be exclusively rotatable and at another end so as to be rotatable and longitudinally displaceable, the link guide being formed via a substantially S-shaped guide groove and a guide groove in each slide. The slide has a round cross-section. Such an arcuate design also makes sense, as it allows the S-shaped guide groove to be traversed without interference and the door hinge to be moved between a closed and an open position.

U.S. Pat. No. 7,861,378 also shows a door hinge for a concealed arrangement that however differs in particular from EP 1 754 848 in that the guide groove is not S-shaped but straight and the slide in the guide groove is of a square cross-section. This square cross-section ensures better support of the hinge link on the slide. However, such guidance is only possible due to the straightness of the guide grooves. The slide has a cylindrical seat in which the link is pivoted via a pin. Such a design is also described in principle in U.S. Pat. No. 8,863,461, although in contrast to EP 1 574 649 the guide grooves are closed on the side and also have a stepped cross-section. As a result, the corresponding slide rests on the guide groove at two different levels, thus ensuring improved support.

It is further known from DE 10 2019 100 302 that the slides can be formed with a rectangular shape.

The known solutions have basically proven their worth. However, they are only suitable to a limited extent and not for supporting the hinge links under a high mechanical load.

OBJECTS OF THE INVENTION

It is therefore an object of the present invention to provide an improved door hinge.

Another object is the provision of such an improved door hinge that overcomes the above-given disadvantages, in particular that carry a particularly heavy door.

SUMMARY OF THE INVENTION

A door hinge has according to the invention first and second leaf assemblies. The first assembly is formed with a longitudinal guide groove. First and second links are connected to each other for relative pivoting about a vertical axis. The first link is pivoted in a longitudinally displaceable slide in the groove. This slide has a length longitudinally of the guide groove and a width transversely of the guide groove. The ratio of the length to the width of the slide is at least 2:1.

A longitudinal direction of the guide groove is understood to be a direction in which the slide is functionally movable, while the width direction is understood to be a direction transverse to this direction and perpendicular to side walls delimiting the guide groove.

According to the invention, the slide in contrast to the solutions known in the prior art is elongated so that, in particular, it is not possible to insert the slide rotated by 90°. In addition, the elongated shape also creates a larger bearing surface on which the first hinge link can be supported. In particular, this prevents tilting of the door panel even in the open position of the door hinge.

It is understood that the first link is mounted for longitudinal displacement in a corresponding guide groove by an upper slide and a lower slide whose relative orientations are different depending on door setup so that “upper” and “lower” refer to the standard installation of the door hinge. In principle, it is sufficient if only one of the two slides is designed with the elongated shape according to the invention. This is preferably the lower slide that bears most of the weight acting on the hinge link. In principle, however, it is advisable to design both slides according to the invention to prevent upside-down of any of the parts. All of the following features can therefore be adopted for only one slide, but preferably equally for both slides and guide grooves.

Preferably, the ratio of the length to the width of the slide is between 2:1 and 3:1, preferably between 2:1 and 2.5:1, and particularly preferably between 2.0:1 and 2.3:1. This ensures on the one hand allows a sufficiently large contact surface, while at the same time the length of the guide groove and thus the installation depth of the leaf assembly can be kept small. It should be noted here that due to the elongated slide, the design requires a certain dead space to be provided in the guide groove to hold the slide in a closed or open position, but that does not contribute to the kinematics of the hinge links.

The design of the slide depends in particular on the design of the guide groove. According to a preferred embodiment, the slide has a length between 8 and 16 mm, particularly preferably between 10 and 15 mm and preferably between 11 and 14 mm. The width of the slide corresponds essentially to the width of the guide groove minus a certain tolerance that allows jam-free sliding in the guide groove. Preferably, the width of the slide is between 3 and 12 mm, preferably between 4 and 11 mm and particularly preferably between 5 and 10 mm. The depth of the slide is preferably between 3 and 7 mm, preferably between 4 and 8 mm.

According to a preferred further development of the invention, the slides each have a pivot seat for pivotally mounting the first link, the pivot seat in each slide being offset from its center relative to length. According to such an embodiment, a pivot pin is accordingly inserted into the first link and then into the pivot seat, thereby connecting the slides to the link. With on an elongated design of the slide and an eccentric arrangement of the pivot seat, this results in a comparatively large contact surface adjacent the pivot seat. According to a preferred embodiment, the spacing between the center of the pivot seat and the center of the slide is between 15 and 30% of the length of the slide, preferably between 17 and 23% of this length.

The pivot seat is preferably circular in shape and may be in the form of a recess or bore in the slide. Here, a bore is understood to be a throughgoing hole that extends through the entire depth of the slide and is open at both ends. A recess, on the other hand, does not extend over the entire depth and thus only opens at one end.

According to a preferred embodiment of the invention, the pivot seat is offset toward a first end of the slide, so the first end abuts a first guide groove end in the closed position of the hinge. According to such an embodiment, the support surface of the slide for the first link in front of the pivot seat with respect to movement on opening.

As explained previously, the groove width of the guide groove is preferably based on the width of the slide and, taking into account a tolerance, is preferably between 3 and 12 mm, preferably between 4 and 11 mm and particularly preferably between 5 and 10 mm. The groove length of the guide groove is preferably between 20 and 40 mm, particularly preferably between 22 and 35 mm and most preferably between 25 and 30 mm. The groove depth is between 2 and 6 mm.

According to a further development of the invention the guide groove has a widened section extending only along part of the longitudinal length, and the guide groove in the widened section is formed with a larger groove width than in sections outside the widened section and the slide in the guide groove has laterally projecting wings that engage the widened section. Thus, both the slide and the guide groove have a first section with a larger width and a second section with a smaller width, the wider section forming the widened section. This widened section can in principle extend over the entire groove depth. However, a preferred embodiment is one in which the widened section extends over only a portion of the groove height, resulting there in a T-section or stepped groove cross-section. Preferably, the widened section is immediately adjacent to the groove opening. The ratio of the width of the widened section to the width of the guide groove in sections outside the widened section is preferably between 1.6:1 and 1.1:1, preferably between 1.5:1 and 1.2:1. Unless the widened section extends over the entire groove height, the ratio of the depth of the widened section to the total groove depth is between 0.1 and 0.2, preferably between 0.12 and 0.18.

According to a further development of the invention, the widened section extends only over an area of the groove length. This also prevents or detects in good time a rotation of 180° when the slide is inserted. In this case, the widened section preferably extends over a range between 45 and 75%, particularly preferably between 50 and 70% and especially preferably between 55 and 65% of the groove length.

Based on such an embodiment, the laterally projecting wings of the respective slide do not extend the full length of the slide.

In particular, the projecting wings extend at the end to one end of the slide. This is preferably the second end of the slide that is adjacent to a second end of the guide groove in a closed position of the door hinge.

According to a preferred further development, the guide groove is closed at both longitudinal ends, a closed end in the context of the invention meaning that the slide cannot exit the guide groove even under hypothetical circumstances.

In addition, the guide groove is preferably straight. Furthermore in addition, the guide groove is preferably arranged to be perpendicular to a plane in which the two leaf assemblies face each other in the closed position.

With respect to the design of the door hinge, the present invention is only subject to a few restrictions. In particular, it may be provided that the guide grooves are at least partially integrally formed in the first leaf assembly. According to a preferred embodiment, however, it is provided that each guide groove is formed in a mount that is detachably fastened to a housing of the first leaf assembly. In particular, both guide grooves for the upper and lower support of the first link are formed in a separate mount that can then in turn be fastened to a housing of the first leaf assembly. This makes it possible on the one hand, even with a closed guide groove, in a simple manner, to move the guide slides to be connected with the hinge pin into the guide grooves. In addition, a detachable fastening also allows the leaf assemblies to be adjusted relative to each other, so that the door panel in particular can be subsequently adjusted in the door frame even after it has been mounted on the door hinge.

Various alternatives can also be considered with regard to the design and arrangement of the hinge links. Thus, a first alternative provides that the second hinge link is detachably and pivotally attached to the second hinge link. Thus, both hinge links each have one end that is rotatable and longitudinally displaceable and at another end that it is only rotatable. In this respect, a design of the link guide that corresponds to the design of the first link according to the invention can also be considered with regard to the second link bracket. The features already mentioned with respect to the first link can therefore also be adopted analogously for the second link.

Alternatively, the second hinge link can also be mounted exclusively rotatably on both leaf assemblies, in which case the second hinge link is formed from two link parts pivotally connected to each other. According to such an embodiment, therefore, not only pivoting of the second hinge link takes place. Rather, the two link parts are also pivoted to each other in the course of an opening or closing movement.

According to a further development of the invention, the leaf assemblies can be inserted in mortises in the edge of a door panel and in a door frame, preferably the reveal side of the door frame. This results in a concealed arrangement of the door hinge between the door frame and the door panel, so that accordingly the door hinge is not visible from the outside in the closed position.

It is further an object of the invention to provide a door comprising a door panel, a door frame and at least one door hinge according to the invention, where the first leaf assembly is fitted and fastened in a mortise in the door frame and the second leaf assembly is fitted and fastened in a mortise in an edge of the door panel. Preferably, at least two door hinges according to the invention are arranged one above the other, so that the door panel is supported on the door frame via two door hinges. This results in a considerably more stable mounting and movement of the door panel. In principle, it is also conceivable that more than two door hinges according to the invention are provided. This is particularly useful for particularly heavy door panels.

BRIEF DESCRIPTION OF THE DRAWING

The above and other objects, features, and advantages will become more readily apparent from the following description, reference being made to the accompanying drawing in which.

SPECIFIC DESCRIPTION OF THE INVENTION

Figure 1B:
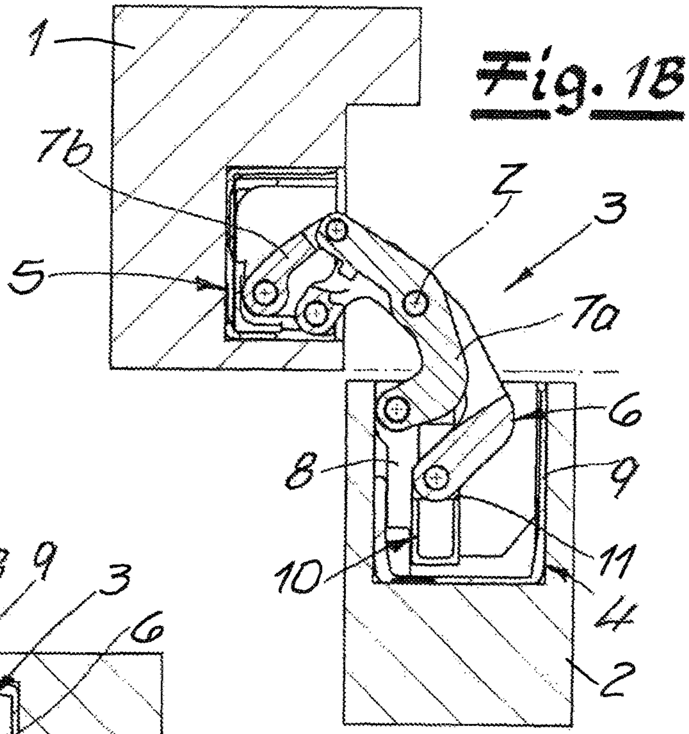
FIGS. 1A and 1B shows a door with a door hinge according to the invention in a closed position and an open position, respectively.
Figure 1A:
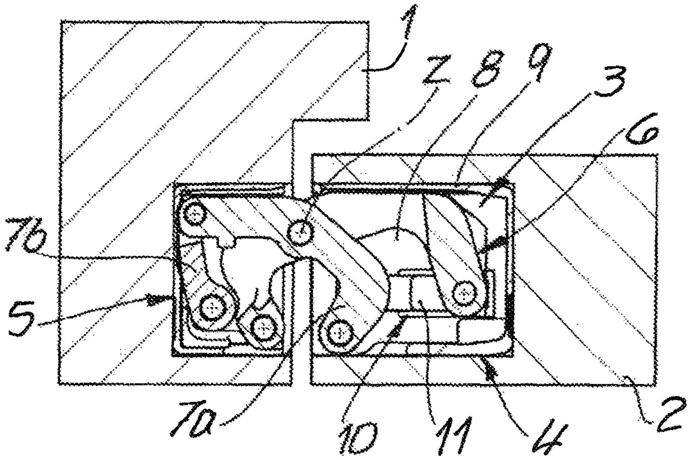

FIG. 1A shows a door in a closed position, while FIG. 1B shows the door in an open position in which the door panel 2 is rotated 180° relative to a door frame 1. A door hinge 3 pivotally supports the door panel 2 relative to the door frame 1. For this purpose, the door hinge 3 has a first leaf assembly 4 that fits in a mortise in the edge of the door panel 2. In addition, a second leaf assembly 5 of the door hinge 3 fits in a mortise in the reveal of the door frame 1.

Due to such a design, the door hinge 3 is not visible from the outside in a closed position of the door and thus cannot detract from the appearance of the door. However, it is not necessary to recess the leaf assemblies 4 and 5 in the door frame 1 and the door panel 2 in order to achieve the concealed effect. The hinge arrangement must also be designed to allow the door panel 1 to pivot without the pivot axle being outside the door plane.

Figure 2:
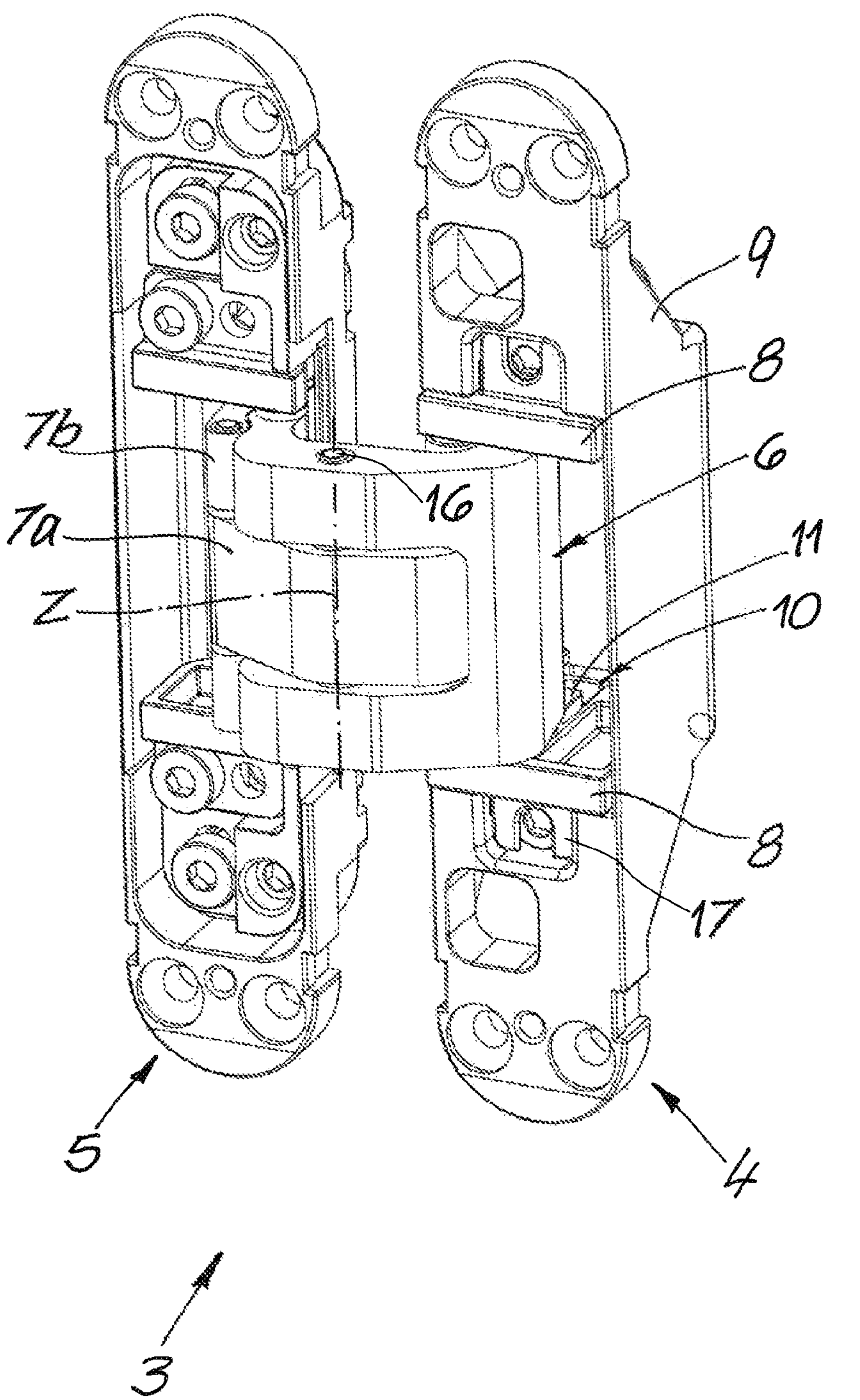
FIG. 2 is an isometric view of the door hinge according to the invention in the fully open position.

The exact design of the door hinge 3 is shown in more detail in FIG. 2. First and second hinge links 6 and 7*a*, 7*b* are rotatably interconnected by a pin 16 at the vertical axis Z of the pin 16 and enable the two leaf assemblies 4 and 5 to pivot relative to one another. The second hinge link 7*a*, 7*b* is furthermore formed by two link parts 7*a*, 7*b* that are pivoted on each other, with the first link part 7*a* also pivoted in the first leaf assembly 4 and the second link part 7*b* in the second leaf assembly 5.

In contrast to the second hinge link 7*a*, 7*b*, the first hinge link 6 is formed as a single piece and thus does not consist of parts that can pivot relative to each other. In addition, the first link 6 is only pivotal in the second leaf assembly 5 but is both pivotal and longitudinally movable in the first leaf assembly 4. The precise design of such a bearing assembly can be seen in particular in FIG. 3 that shows only the first hinge link 6 and the mounts 8 that support the first hinge link 6 in the first leaf assembly 4.

The mounts 8 are manufactured separately from and are detachably connected to a housing 9 of the first leaf assembly. Via this detachable fastening, the mounts 8 and thus also the position of the first hinge link 6 can be adjusted relative to the housing 9, so that adjustment of the position of the door panel 2 within the door frame 1 is possible after assembly. Furthermore, such a separate embodiment of the mounts 8 also makes it possible to easily insert a hinge pin for connecting the mounts 8 to the first hinge link 6 such that the assembly shown in FIG. 3 can then be fitted with the second hinge link 7*a*, 7*b* on the first leaf part 4.

Figure 3:
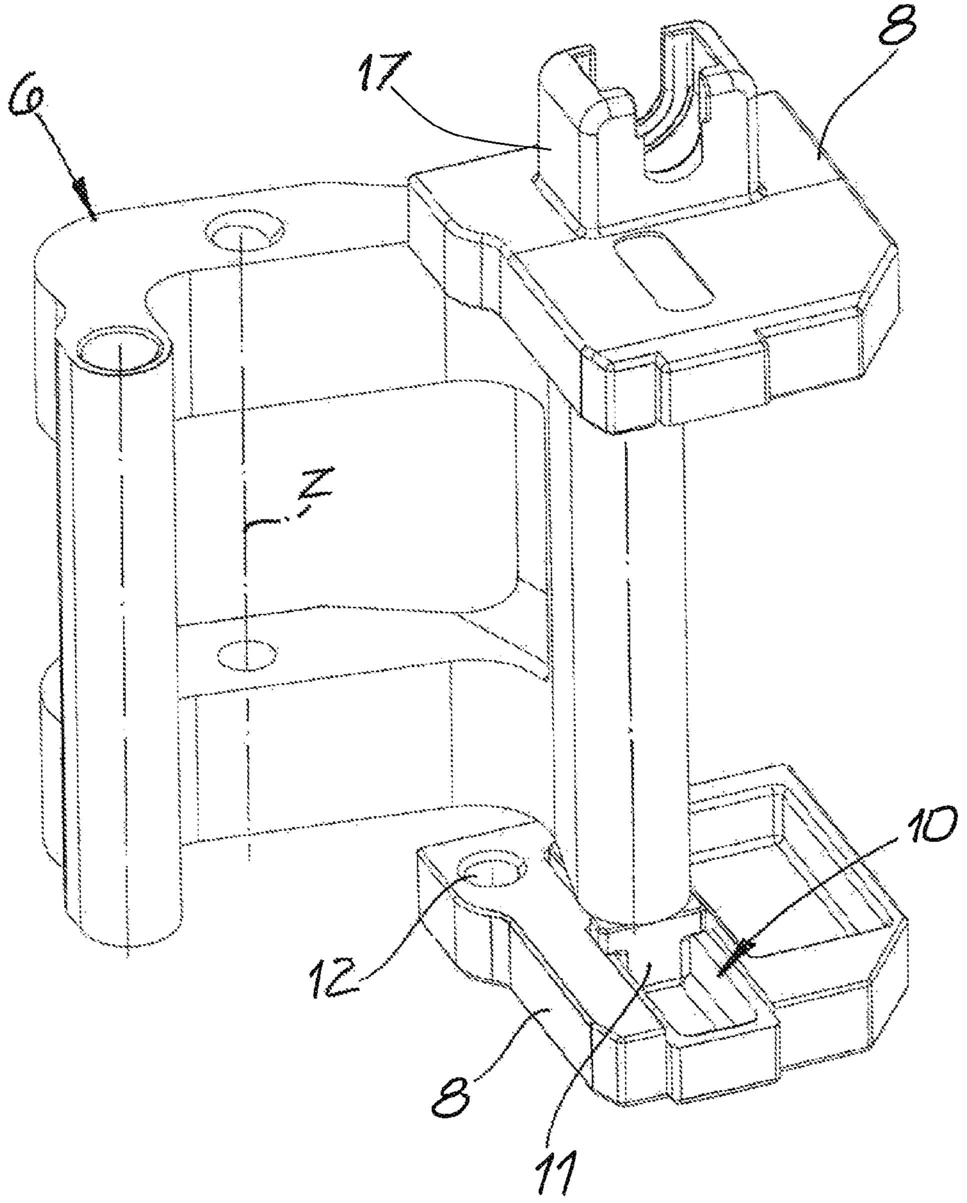
FIG. 3 is a detailed view of the door hinge according to FIG. 2 with only the first hinge link and the mounts shown.

FIG. 3 shows how the mounts 8 each have a longitudinal groove 10 in which moves a slide 11 that carries the pivot of the first hinge link 6. Here, the mounts 8 are formed as zinc die-cast parts, so that the guide grooves 10 are formed during manufacture of the mount 8 as is a pivot seat 12 for the second hinge link 7*a*, 7*b*.

Figure 5:
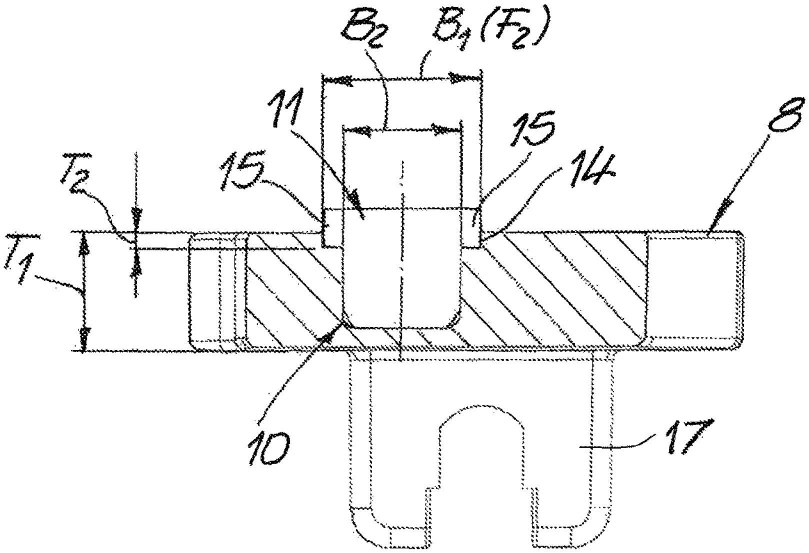
FIG. 5 is a sectional view through the mount and the slide in the position of FIG. 4B.
Figure 4A:
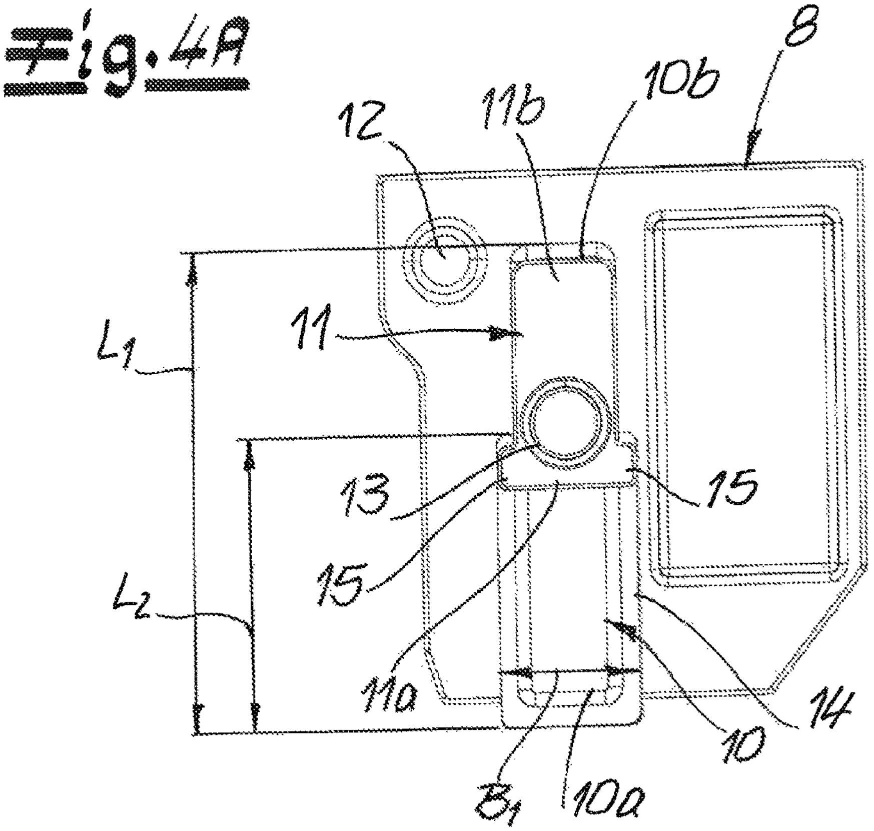
FIGS. 4A and 4B are detailed view of the lower mount according to the FIG. 3, with the slide shown in an open position and a closed position.
Figure 4B:
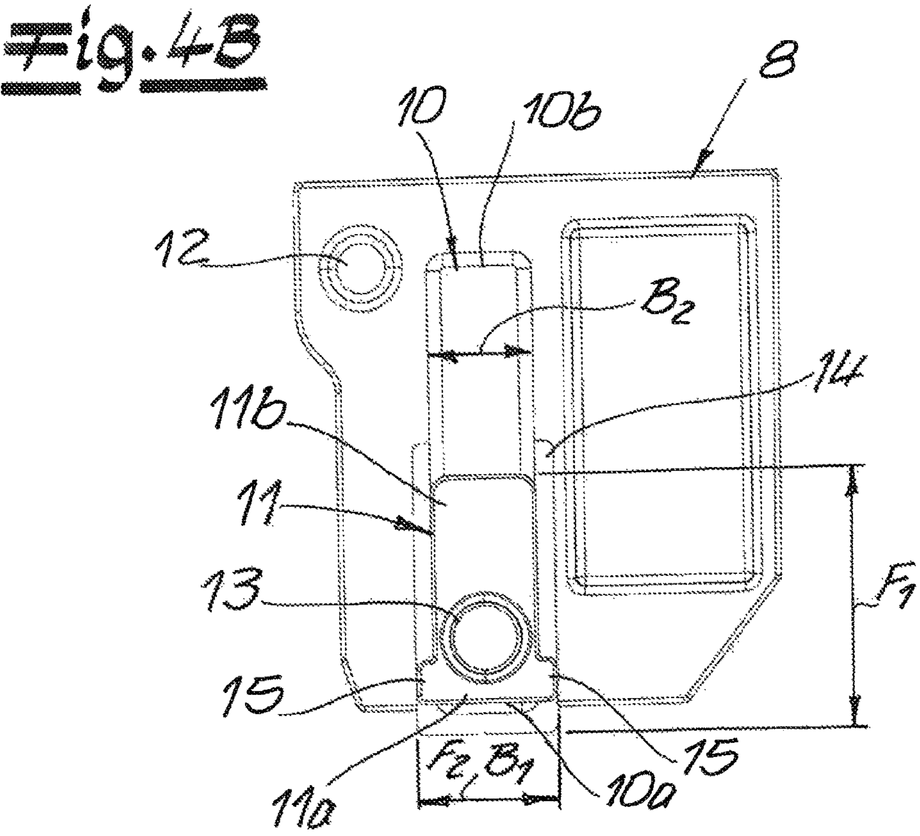

The design of the mounts 8 with the guide groove 10 as well as the slide 11 in the guide groove 10 can be taken in particular from FIGS. 4A, 4B, and 5. FIG. 4A shows the mount 8 in the open position and FIG. 4B shows the mount 8 in the closed position. Here, FIGS. 4A and 4B differ essentially in the position of the slide 11 in that according to FIG. 4B an inner end 11*a* of the slide 11 is at an inner groove end 10*a* and according to FIG. 4A the slide 11 has its outer end 11*b* at an outer groove end 10*b*.

According to the illustrated embodiment, the guide groove 10 has a length $L_1$ of between 20 and 40 mm. A length $F_1$ of the slide 11 is between 8 and 18 mm. The width $F_2$ of the guide groove 10 is between 3 and 9 mm and corresponds approximately to a width $B_1$ of the slide 11, the slide 11 having a slightly smaller width in order to slide without jamming in the guide groove 10. A depth $T_1$ of the guide groove 10 is between 3 and 8 mm, the slide 11 being designed in such a way that it is at least flush with the surrounding surfaces of the mount 8 with respect to the guide groove and preferably projects to a small extent with respect thereto.

Overall, the slide 11 thus is elongated with a length $F_1$ extending in the longitudinal direction of the groove and a width $F_2$ extending in the transverse width direction of the guide groove 10, the ratio of the length $F_1$ to the width $F_2$ of the slide 11 being at least 2:1. In addition, a pivot seat 13 is formed in the slide 11 where the slide 11 is pivotally connected to the first hinge link 6 by a separate pivot pin.

This pivot seat 13 is offset transversely relative to the length $F_1$ of the slide 11 and also longitudinally from the first end 11*a* of the slide 11.

FIGS. 3 to 5 further show that the guide groove 10 is of T-section and for this purpose has a widened outer section 14 of a larger groove width $B_1$, $B_2$ than in sections outside the widened section, and the slide 11 in the guide groove 10 has laterally projecting wings 15 that engage in the widened section 14.

In this case, the widened section 14 extends only over part of the guide groove 11, a length $L_2$ of the widened section 14 being between 45 and 75% of the groove length $L_1$.

Furthermore, the widened section 14 extends only over a range of the groove height $T_1$, and the ratio of the height $T_2$ of the widened section 14 to the groove height $T_1$ corresponds to between 0.1 and 0.2, preferably between 0.12 and 0.18.

In addition, as shown in FIGS. 1A and 1B, the second link 6 is only pivotal in the mounts 8 of the second leaf assembly 5 so that only the first leaf assembly 4 is formed with guide grooves 10. It is understood that within the scope of the invention, an embodiment is also possible in which the second link 6 is longitudinally displaceable in the first leaf assembly 5, in which case an two-part design of the second link 7*a*, 7*b* is not required.

We claim:

1. A door hinge comprising:

first and second leaf assemblies, the first assembly having a housing;

a mount detachably fastened in the housing and formed with a longitudinally extending guide groove;

first and second links respectively extending from the first and second leaf assemblies and pivotally connected to each other for relative pivoting of the first and second leaf assemblies about a vertical axis; and a slide longitudinally displaceable slide in the groove, the first link being pivoted in the slide, the slide having a length measured longitudinally of the guide groove and a width measured transversely of the guide groove, a ratio of the length to the width of the slide being at least 2:1.

2. The door hinge according to claim 1, wherein a ratio of the length to the width of the slide is between 2:1 and 3:1.

3. The door hinge according to claim 1, wherein the slide has a pivot seat for pivoting the first link, the pivot seat being offset from a center of the slide relative to the slide length.

4. The door hinge according to claim 3, wherein the pivot seat is offset toward a first end of the slide, the first end being adjacent a first guide groove end in a closed position of the door hinge.

5. The door hinge according to claim 1, wherein the guide groove has a widened section extending only partly longitudinally of the guide groove and that is formed in the widened section with a larger groove width than in sections offset from the widened section, the slide being engaged in the guide groove with projecting wings that engage in the widened section.

6. The door hinge according to claim 5, wherein the wings are spaced longitudinally along the slide.

7. The door hinge according to claim 1, wherein the guide groove is closed at both longitudinally opposite ends.

8. The door hinge according to claim 1, wherein the guide groove is straight.

9. The door hinge according to claim 1, wherein the second hinge link is longitudinally displaceable and rotatably mounted on the second leaf assembly.

10. The door hinge according to claim 1, wherein the leaf assemblies fit into mortises in the edge of a door panel and in a door frame.

11. In combination with the door hinge according to claim 1:

a door with a door panel and a door frame, the second leaf assembly being set in a mortise in the door frame and the first leaf assembly in a mortise in an edge of the door panel.

12. A door hinge comprising:

first and second leaf assemblies, the first assembly being formed with a longitudinally extending guide groove;

first and second links respectively extending from the first and second leaf assemblies and pivotally connected to each other for relative pivoting of the first and second leaf assemblies about a vertical axis; and a longitudinally displaceable slide in the groove and having a length of 8 to 16 mm, the first link being pivoted in the slide, the slide having a length longitudinally of the guide groove and a width transversely of the guide groove, the ratio of the length to the width of the slide being at least 2:1.

13. A door hinge comprising:

first and second leaf assemblies, the first assembly being formed with a longitudinally extending guide groove;

first and second links respectively extending from the first and second leaf assemblies and pivotally connected to each other for relative pivoting of the first and second leaf assemblies about a vertical axis; and a slide longitudinally displaceable in the groove and having a length between 20 and 40 mm, the first link being pivoted in the slide, the slide having a length longitudinally of the guide groove and a width transversely of the guide groove, the ratio of the length to the width of the slide being at least 2:1.

14. A door hinge comprising:

first and second leaf assemblies, the first assembly being formed with a longitudinally extending guide groove;

first and second links respectively extending from the first and second leaf assemblies and pivotally connected to each other for relative pivoting of the first and second leaf assemblies about a vertical axis; and a slide longitudinally displaceable in the groove and extending longitudinally over between 45 and 75% of the groove, the first link being pivoted in the slide, the slide having a length longitudinally of the guide groove and a width transversely of the guide groove, the ratio of the length to the width of the slide being at least 2:1.

15. The door hinge according to claim 14, wherein the widened section extends only over part of a groove height.

16. A door hinge comprising:

first and second leaf assemblies, the first assembly being formed with a longitudinally extending guide groove, the second hinge link being only pivotal on the second leaf assembly, the second hinge link being formed from two link parts that pivot on each other;

first and second links respectively extending from the first and second leaf assemblies and pivotally connected to each other for relative pivoting of the first and second leaf assemblies about a vertical axis; and a longitudinally displaceable slide in the groove, the first link being pivoted in the slide, the slide having a length longitudinally of the guide groove and a width transversely of the guide groove, the ratio of the length to the width of the slide being at least 2:1.

17. The door hinge according to claim 16, wherein the guide groove is formed in a mount that is detachably fastened to a housing of the first leaf assembly.

* * * * *